United States Patent
Nobukiyo et al.

(10) Patent No.: US 7,079,859 B2
(45) Date of Patent: Jul. 18, 2006

(54) BEST-CELL AMENDMENT METHOD FOR AMENDING HYSTERESIS MARGIN ACCORDING TO THE DEGREE OF CONGESTION

(75) Inventors: Takahiro Nobukiyo, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 523 days.

(21) Appl. No.: 10/628,478

(22) Filed: Jul. 29, 2003

(65) Prior Publication Data
US 2004/0072565 A1 Apr. 15, 2004

(30) Foreign Application Priority Data
Aug. 1, 2002 (JP) ............................. 2002-224698

(51) Int. Cl.
*H04B 7/00* (2006.01)
*H04Q 7/20* (2006.01)
(52) U.S. Cl. .................. 455/522; 455/13.4; 455/127.5; 455/135; 455/436; 455/452.2; 455/453; 455/525; 370/331
(58) Field of Classification Search ................ 455/522, 455/13.4, 127.7, 135, 436, 437, 452.2, 453, 455/525, 571; 370/331
See application file for complete search history.

(56) References Cited

U.S. PATENT DOCUMENTS

| | | | |
|---|---|---|---|
| 5,509,051 A * | 4/1996 | Barnett et al. ............... | 455/443 |
| 5,640,677 A * | 6/1997 | Karlsson ..................... | 455/434 |
| 6,434,389 B1 * | 8/2002 | Meskanen et al. .......... | 455/437 |
| 6,445,917 B1 * | 9/2002 | Bark et al. .................. | 455/423 |

FOREIGN PATENT DOCUMENTS

| | | |
|---|---|---|
| JP | 7-79474 | 3/1995 |
| JP | 8-298687 | 11/1996 |
| JP | 10-276463 | 10/1998 |
| JP | 11-340909 | 12/1999 |
| JP | 2001-119342 | 4/2001 |

* cited by examiner

*Primary Examiner*—Edan Orgad
*Assistant Examiner*—Shaima Q. Aminzay
(74) *Attorney, Agent, or Firm*—McGinn IP Law Group, PLLC

(57) ABSTRACT

A best-cell amendment method is disclosed for amending hysteresis margins according to the degree of congestion. A radio network controller (RNC) compares the average value P(k) of transmission power of a downlink shared channel PDSCH of cell k and a first threshold value P_threshold1 to measure the degree of congestion. If the RNC determines that the degree of congestion in cell k is high, it sets a small hysteresis margin hm_a, and if RNC determines that the degree of congestion in cell k is low, it sets a large hysteresis margin hm_b.

21 Claims, 12 Drawing Sheets

BEST-CELL AMENDMENT METHOD FOR AMENDING HYSTERESIS MARGIN ACCORDING TO THE DEGREE OF CONGESTION

BACKGROUND OF THE INVENTION

1. Field of the Invention

The present invention relates to a mobile communication system provided with a plurality of base stations, a plurality of mobile stations, and at least one radio network controller; and more particularly to a best cell amendment method by which the radio network controller determines the best cell for a mobile station and amends the best cell for that mobile station.

2. Description of the Related Art

The Third Generation Partnership Project (3GPP), a project committed to standardizing international standards for third-generation mobile communication systems, is investigating methods for using PDSCH (Physical Downlink Shared Channels) that are defined in, for example, the technical specification "3GPP TS 25.211 V4.0.0 (2001–03)" of the 3GPP, and methods for using HS-PDSCH (High-Speed Physical Downlink Shared Channels) that are defined in, for example, the 3GPP technical specification "3GPP TR 25.848 V4.0.0 (2001–03)" as methods for the high-speed transmission of data from a base station of a mobile communication system to a downlink line, which is a line to mobile stations within cells that are controlled by that base station.

PDSCH and HS-PDSCH are both used for transmitting data from a base station to a plurality of mobile stations. A plurality of users share one or a plurality of lines by means of the time division of this PDSCH and HS-PDSCH.

When using PDSCH to transport data, the base station sets Uplink Dedicated Physical Channels (UL DPCH) and Downlink Dedicated Physical Channels (DL DPCH) between each base station and the plurality of mobile stations for each cell in order to control data transfer to mobile stations that are in the cell that is controlled by the base station. UL DPCH is used by a mobile station to transmit user information or control information to a base station, and DL DPCH is similarly used by a base station to transmit user information or control information to a mobile station. In addition, each cell transmits a Common Pilot Channel (CPICH) as a pilot signal.

In this type of mobile communication system, a mobile station communicates by establishing a line with, of a plurality of base stations, the base station that has the best conditions. For this purpose, a radio network controller determines which of the base stations is the best base station (the best cell) for a plurality of mobile stations and reports the best cell to each mobile station. The mobile stations then each establish a PDSCH with the best cell that has been reported from the radio network controller.

However, a mobile station moves among a plurality of cells, and the best cell therefore changes over time along with this movement. The radio network controller must therefore determine the best cell for that mobile station at fixed time intervals, and when a best cell other than the cell that is currently set as the best cell becomes the best cell, a process is necessary for setting this new cell as the best cell.

Explanation next regards a method of the prior art for amending the best cell. The radio network controller sets a hysteresis margin as the control information and reports this hysteresis margin to each base station. The hysteresis margin is a threshold value for determining whether the best cell is to be amended. Each base station uses DL DPCH to report the hysteresis margin to mobile stations that are in cells managed by that base station. The mobile stations then measure the reception quality of the CPICH of the best cell and at least one other cell within a set time interval, and if the reception quality of at least one other cell is higher than the reception quality of the best cell, and moreover, if this difference is greater than the reported hysteresis margin, the mobile stations report information relating to the result of measuring reception quality to the radio network controller by way of the cell that has set the UP DPCH. The radio network controllers then amend the best cells of the mobile stations in response to these notifications from the mobile stations.

A data transmission method that uses HS-PDSCH has a larger volume of data transfer than a method that uses PDSCH and is referred to as High-Speed downlink Packet Access (HSDPA). Uplink and downlink control channels are also set for controlling the transmission of data from the base station to a mobile station when HS-PDSCH is used to transmit data. As with PDSCH, the amendment of the best cell is realized by comparing the reception quality of a downlink signal with a hysteresis margin.

In the method of the prior art for amending the best cells that was described in the foregoing explanation, there was the problem that the state of the load in cells having a high degree of congestion could not be improved when the hysteresis margin was large. There was also the problem that the inability to improve the degree of congestion resulted in a degradation of traffic balance. There was the additional problem that the amendment of the best cell after the occurrence of a large difference in the reception quality of a CPICH results in an increase in the amount of transmission power for transferring data, i.e., the transmission power per information bit, and a corresponding decrease in the data transfer capacity. Finally, when the hysteresis margin is small, cases do occur in which a mobile station moves from a cell in which the degree of congestion is low to a cell in which the degree of congestion is high, resulting in such problems as the degradation of traffic balance or an increase of the load upon the radio network controller due to frequent amendment of best cells.

In other words, the above-described mobile communication system of the prior art suffers from the problem that, because the hysteresis margin is a fixed value regardless of the degree of congestion, a state of poor traffic balance will remain unchanged without any improvement in the state of load in cells having a high level of congestion, even when cells having a high level of congestion are immediately adjacent to cells having a low level of congestion.

Japanese Patent Laid-Open No. H10-276463, which is directed toward solving these types of problems, discloses a mobile communication system in which an exchange that exercises control over base stations measures the amount of traffic in each of the base stations and amends the threshold value when initiating handoff processing in accordance with this amount of traffic, thereby impeding switching to cells that are controlled by base stations having a large amount of traffic and easing the switching from cells that are controlled by base stations having a large amount of traffic to other cells, and thereby controlling the distribution of traffic to achieve an optimum. In this case, traffic can be understood from the above-described patent document to mean the number of connected calls or the number of connected channels.

This type of mobile communication system determines congestion based on the volume of traffic and facilitates the switching of mobile stations of cells having a large amount of traffic to other cells. As an example, when a cell having a large amount of traffic is immediately adjacent to a cell having a small amount of traffic, setting the threshold value of the cell having a large amount of traffic to a lower value results in the switching of mobile stations in a direction that improves traffic balance. However, if the amount of traffic is high in both a particular cell and in an adjacent cell, the threshold values will remain high in both cells in this prior-art method of amending best cells, with the result that almost no switching occurs between the cells.

When cells having a large amount of traffic are adjacent, however, differences will occur in system throughput due to the distribution of users and the amount of data that is being transmitted by the base station. In such a case, system throughput is improved by using the above-described system throughput to determine the degree of congestion, and then switching mobile stations from cells having a high level of congestion to cells having even a slightly lower level of congestion. In the mobile communication system of the prior art disclosed in the above-described gazette, however, almost no switching of mobile stations is carried out, and an improvement in system throughput therefore cannot be expected. In this case, system throughput represents the number of bits that a base station that controls cells succeeds in transmitting per unit of time.

On the other hand, when cells having a small amount of traffic are immediately adjacent, the mobile communication system of the prior art disclosed in the above-described official gazette causes threshold values to be set uniformly low, whereby the frequency of the amendment of best cells increases even though almost no improvement in system throughput is obtained.

SUMMARY OF THE INVENTION

It is an object of the present invention to provide a mobile communication system, a best cell amendment method, and further, a radio network controller that uses this method that: in a case in which two adjacent cells have a high degree of congestion, causes a shift from the cell having a higher degree of congestion to the cell having even a slightly lower degree of congestion and thus enables an improvement in system throughput, and moreover, in a case in which two adjacent cells have a low degree of congestion and in which an improvement in system throughput therefore cannot be expected, suppresses the frequency of best cell amendment and thus enables a reduction of the RNC (Radio Network Controller) processing load.

In a typical best cell amendment method, a radio network controller determines a hysteresis margin for each cell, this hysteresis margin being a threshold value for determining whether or not the best cell is to be amended, and notifies each mobile station of the determined hysteresis margin by way of a base station. The mobile stations then measure the reception quality of a downlink signal of the best cell and the reception quality of the downlink signal of another cell having the highest reception quality, and if the reception quality of the other cell having the highest reception quality is better than the reception quality of the best cell by a margin that is equal to or greater than the set hysteresis margin, report the results of measuring reception quality as reception quality information to the radio network controller. The radio network controller then, upon receiving the reception quality information from the mobile stations, executes control to amend the best cells of the mobile stations that have transmitted the reception quality information.

To achieve the above-described object in the best cell amendment method in the mobile communication system of the present invention, a radio network controller measures the degree of congestion in each cell and amends the hysteresis margin of a cell based on the degree of congestion in that cell.

According to the present invention, the radio network controller measures the degree of congestion of each cell and sets the hysteresis margin in each of the cells in accordance with this degree of congestion, whereby the hysteresis margin of cells having a high degree of congestion can be set to a lower value, and the hysteresis margin of cells having a low degree of congestion can be set to a larger value. As a result, mobile stations in cells having a high degree of congestion will tend to be shifted to other cells, thereby encouraging a decrease in the number of mobile stations in that cell and facilitating a decrease in the load in that cell. In addition, setting the hysteresis margin to a low value in cells having a high degree of congestion can encourage processing to select cells having even slightly better quality, and, in systems in which an adaptive spreading factor is selected, can facilitate the selection of SF having a higher data rate. Accordingly, the system throughput of cells having a high degree of congestion can be raised.

In cells having a high degree of congestion, the number of mobile stations will tend to decrease, thereby facilitating an improvement in the traffic balance with cells having a low degree of congestion. In addition, the frequency of best cell amendment is decreased for mobile stations in cells having a low degree of congestion, thereby allowing a reduction of the processing load on the radio network controller, and further, allowing a proportionate increase in the available processing capacity of the RNC, which has a limited processing capacity.

In addition, as the step for amending the hysteresis margin of each cell based on the degree of congestion, the radio network controller may execute a step of reducing the hysteresis margin of cells having a high degree of congestion.

The radio network controller may be further provided with a step of executing control to increase the transmission power of data transmission channels of cells having a low degree of congestion.

In addition, as the step of measuring the degree of congestion of each cell, the radio network controller may execute: a step of determining the degree of congestion based on the average transmission power of data transmission channels of the base stations that control each of the cells; a step of determining the degree of congestion based on the number of mobile stations that have set downlink shared channels with base stations that control the cells; a step of determining the degree of congestion based on the system throughput in each of the cells; or a step of determining the degree of congestion based on the average user throughput in each of the cells.

The above and other objects, features, and advantages of the present invention will become apparent from the following description with reference to the accompanying drawings, which illustrate examples of the present invention.

DETAILED DESCRIPTION OF THE PREFERRED EMBODIMENTS

First Embodiment

Figure 1:
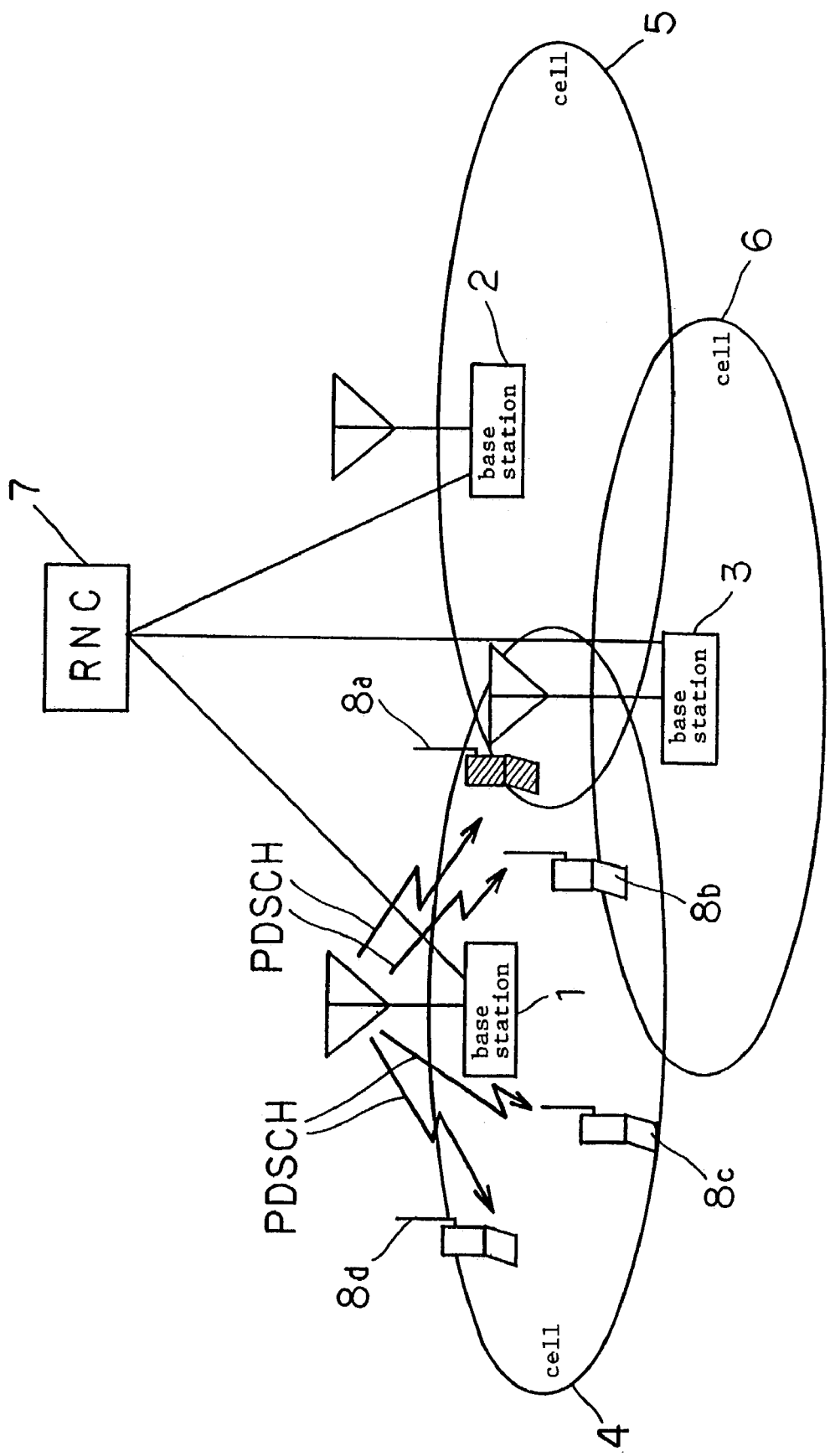
FIG. 1 is a block diagram showing the construction of a mobile communication system of the first embodiment of the present invention.

We first refer to FIG. 1, which shows the construction of a mobile communication system of the first embodiment of the present invention. Referring to FIG. 1, the mobile communication system of the present embodiment is made up from: base stations 1, 2, and 3 for controlling cells 4, 5, and 6, respectively; RNC (Radio Network Controller) 7; and mobile stations 8a, 8b, 8c, and 8d.

Base stations 1, 2, and 3 and RNC 7 are connected by a communication network that is not shown in the figure. Although in actuality a large number of mobile stations are present in cells 4ñ6, in the interest of simplifying the explanation, only mobile stations 8añ8d are shown, the best cell for these mobile stations 8añ8d being cell 4 of base station 1. Since cell 4 is the best cell for mobile stations 8añ8d, mobile stations 8añ8d each set and share the Physical Downlink Shared Channel (PDSCH) for data transmission. In the present embodiment, the data rate of each mobile station can be modified by adaptively selecting the Spreading Factors (SF) of the PDSCH.

Although a case is described in the present embodiment in which each of the three base stations 1, 2, and 3 controls one cell, the present invention is not limited to this form and can be applied to cases in which a single base station controls a plurality of cells, or to a case having two, four, or more base stations. Similarly, a case is described in the present embodiment in which four mobile stations take a particular base station as the best cell, but the present invention is not limited to this form and can be similarly applied to a case in which there are one, two, three, five, or more mobile stations.

Figure 2:
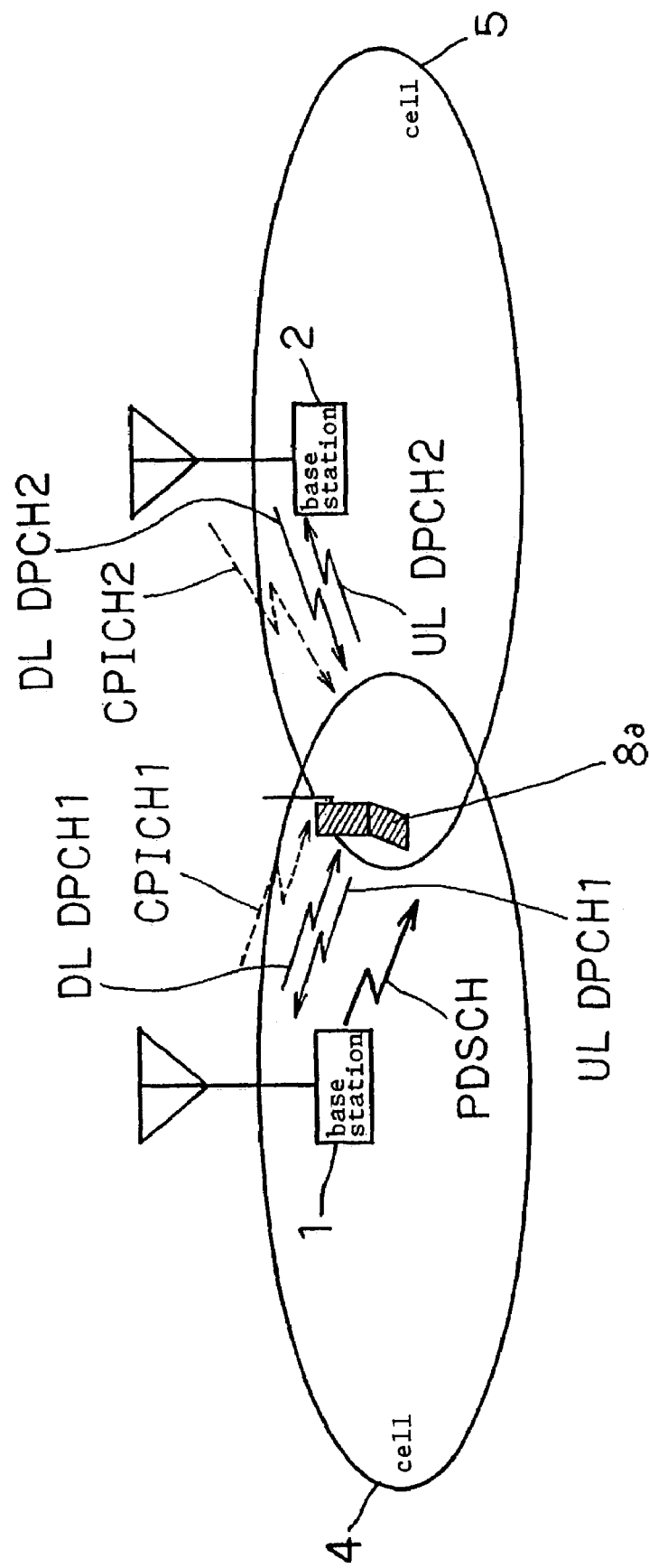
FIG. 2 shows the state of channels that are set by mobile station 8a and base stations 1 and 2 in FIG. 1.

FIG. 2 shows the state of channels that have been set by mobile station 8a and base stations 1 and 2 that are shown in FIG. 1. Referring to FIG. 2, mobile station 8a sets a PDSCH for data transmission with base station 1 that controls cell 4, and sets UL DPCH1 (Uplink Dedicated Physical Channel) and DL DPCH1 (Downlink DPCH) for control. In addition, base station 1, which controls cell 4, transmits CPICH1 (Common Pilot Channel) as a pilot signal. Mobile station 8a similarly sets UL DPCH2 and DL DPCH2 with base station 2, which controls cell 5, but because cell 5 is not the best cell for mobile station 8a, does not set PDSCH. Further, base station 2, which controls cell 5, similarly transmits CPICH2 as a pilot signal. It will also be assumed that mobile stations 8bñ8d also set channels with one or more base stations that include base station 1, which is the best cell.

Figure 3:
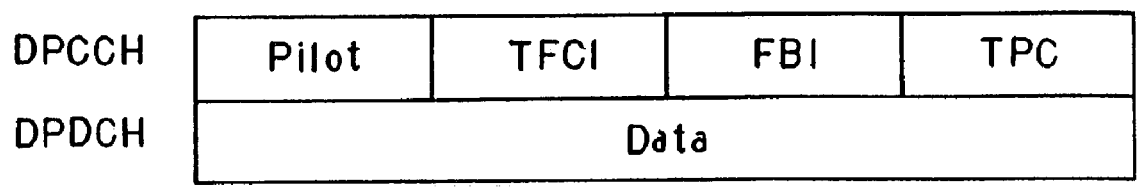
FIG. 3 shows an example of the structure of a UL DPCH slot.

We next refer to FIG. 3, which shows the slot structure of UL DPCH. Referring to FIG. 3, the slot of UL DPCH is made up from: a DPCCH (Dedicated Physical Control Channel) and a DPDCH (Dedicated Physical Data Channel), the DPCCH including pilot bits, a TFCI (Transport Format Combination Indicator), FBI (Feedback Information), and TPC (Transmit Power Control); and the DPDCH being composed of data. The data of UL DPDCH include user information and control information. The reception quality information of the CPICH is treated as control information.

Figure 4:
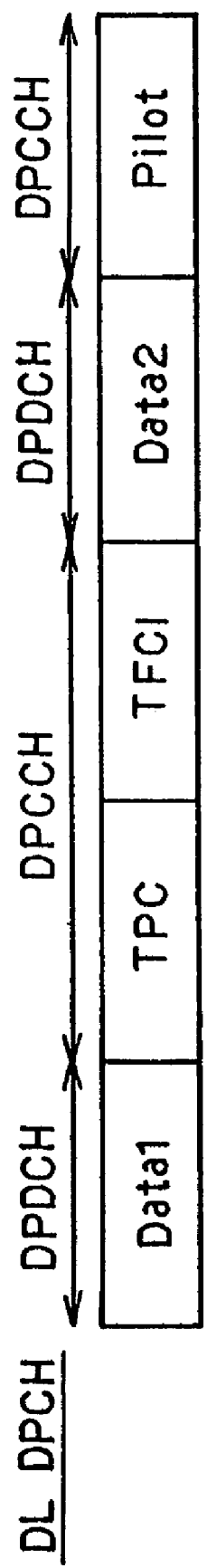
FIG. 4 shows an example of the structure of a DL DPCH slot.

We next refer to FIG. 4, which shows the slot construction of the DL DPCH. Referring to FIG. 4, a DL DPCH slot is made up from: Data 1 (DPDCH), TPC (DPCCH), TFCI (DPCCH), Data 2 (DPDCH), and Pilot (DPCCH). As with the UL DPCH, Data 1 and Data 2 of the DL DPCH contain user information and control information. The threshold values of hysteresis margins and best cell amendment notifications are treated as control information. Details regarding the other components such as TFCI and FBI are explained in, for example, the Technical Specifications "3GPP TS 25.211 V4.0.0 (2001–03)" of the Third-Generation Partnership Project (3GPP).

We next refer to FIGS. 5–9 to explain the details regarding the operation of the mobile communication system of the present embodiment.

Figure 5:
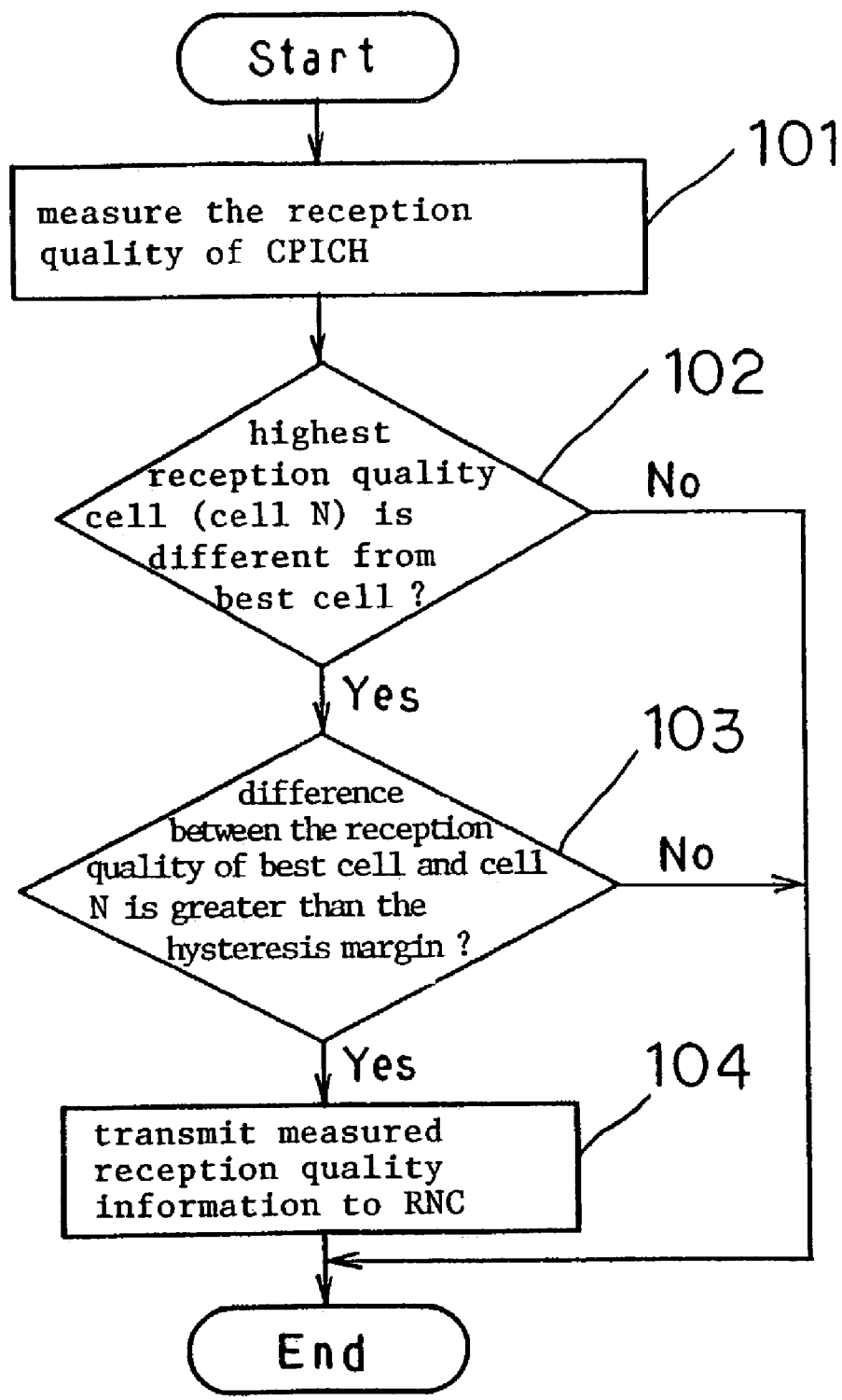
FIG. 5 is a flow chart showing the operation when any mobile station of a mobile communication system measures the reception quality of the CPICH of each cell.

FIG. 5 is a flow chart showing the operations when any mobile station of the mobile communication system measures the reception quality of the CPICH of each cell.

Referring to FIG. 5, in Step 101, the mobile station first measures the reception quality of the CPICH of each cell in which a DPCH is currently set. In step 102, based on the results of measurement, the mobile station then determines whether the cell having the highest reception quality is different from the best cell. If the best cell and the cell having the highest reception quality (here assumed to be cell N) are different in Step 102, the mobile station then determines whether the difference between the reception quality of the best cell and the reception quality of cell N is greater than the hysteresis margin in Step 103. If this difference in reception quality is greater than the hysteresis margin in Step 103, the mobile station transmits the measured reception quality information to the RNC in Step 104. If the best cell and the cell having the highest reception quality (cell N) are one and the same in Step 102, or if the difference in reception quality is equal to or less than the hysteresis margin in Step 103, the process ends without transmission of the reception quality information to RNC.

Although it is assumed in the explanation of this embodiment that the reception quality information is information that indicates the reception quality of the CPICH of each cell, the present invention is not limited to this form and may also be applied to a case in which, for example, the reception quality information is quality information of only the cell having the highest reception quality. The base station sends the received reception quality information to the RNC. The reception quality information is not sent to the base station when the best cell and the cell having the highest reception quality are the same, or when the best cell and the cell having the highest reception quality are different but the difference in reception quality is equal to or less than the hysteresis margin. Each mobile station can measure the reception quality at any timing.

Figure 6:
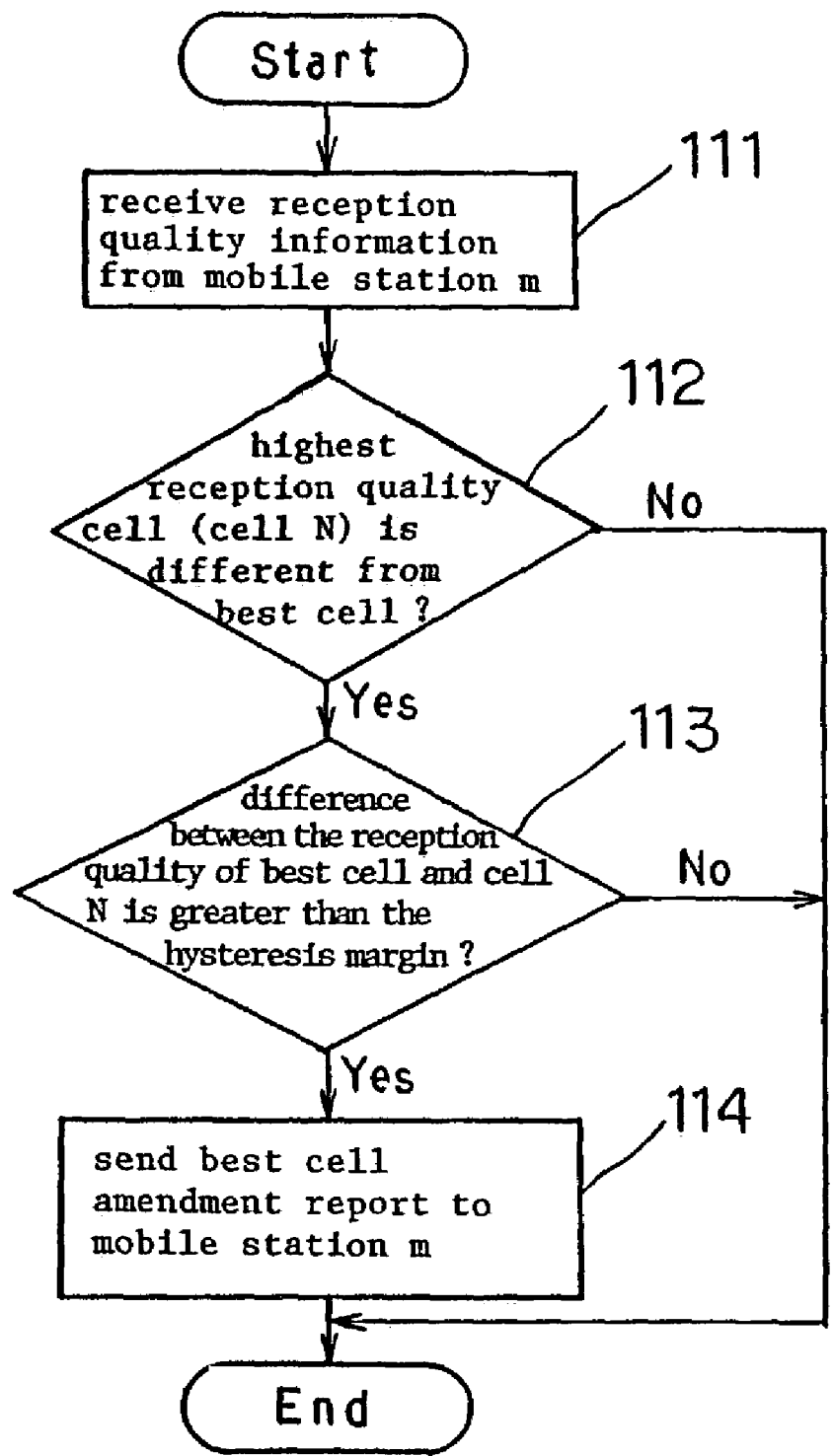
FIG. 6 is a flow chart showing the process when RNC amends the best cell of any mobile station m.

FIG. 6 is a flow chart showing the process when the RNC amends the best cell of any mobile station m.

Referring to FIG. 6, the RNC first receives the reception quality information from mobile station m in Step 111, and then determines whether or not the best cell and the cell having the highest reception quality are different. If the best cell and the cell having the highest reception quality (assumed to be cell N) are different in Step 112, the RNC then determines whether the difference between the reception quality of the best cell and the reception quality of cell N is greater than the hysteresis margin in Step 113. In Step 113, if the difference in reception quality is greater than the hysteresis margin that was reported to mobile station m, the RNC amends the best cell of mobile station m to cell N and sends a best cell amendment report to the mobile station m in Step 114.

If, in Step 112, the best cell and the cell having the highest reception quality (cell N) are one and the same, or if the difference in reception quality in Step 113 is equal to or less than the hysteresis margin, the RNC ends the process without amending the best cell.

Figure 7:
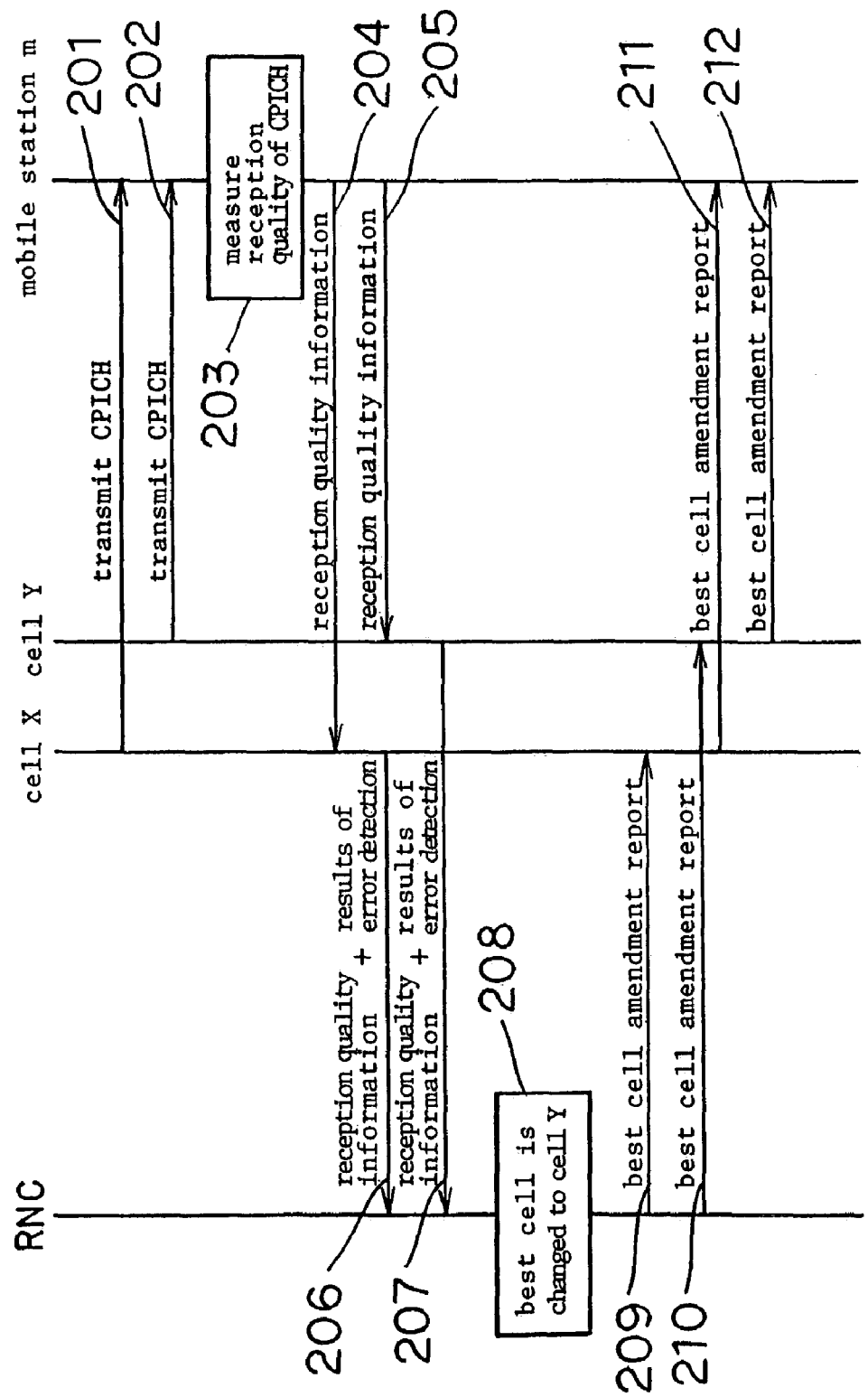
FIG. 7 is a sequence chart showing the operation when mobile station m switches the best cell from cell X to cell Y.

We next refer to FIG. 7, which is a sequence chart for explaining the process shown in the flow charts of FIGS. 5 and 6.

More specifically, FIG. 7 is a sequence chart showing the operations when any mobile station m switches the best cell from cell X to cell Y.

Referring now to FIG. 7, cell X and cell Y each transmit a CPICH signal in Steps 201 and 202, respectively. In Step 203, mobile station m receives the CPICH signals that are transmitted from cell X and cell Y, which are the cells to which mobile station m has set a UL DPCH and DL DPCH, and measures each reception level. If the reception quality of cell Y is higher than the reception quality of the best cell X, and moreover, if the difference in reception quality is greater than the hysteresis margin that has been notified from the RNC, mobile station m sends reception quality information to cell X and cell Y in Steps 204 and 205, respectively. Error detection code (CRC) is appended to this reception quality information, the presence or absence of errors is detected from the CRC that is included in the reception quality information in each of cells X and Y, and the reception quality information is reported together with the results of this error detection to the RNC in Steps 206 and 207. In the RNC, reception quality information that is free of errors is used to determine the amendment of the best cell, and the best cell is changed from cell X to cell Y (Step 208). In this way, accurate reception quality information can reach the RNC as long as reception quality information can be received without error in at least one cell, and the possibility of failure to report reception quality information is therefore reduced. In addition, when reception errors occur in both cells, the RNC requests the mobile station to resend the reception quality information.

The RNC next sends best cell amendment reports to cell X and cell Y in Steps 209 and 210, respectively; and cell X and cell Y each send the received cell amendment reports to mobile station m in Steps 211 and 212, respectively. Mobile station m is thus notified that the best cell has been amended to cell Y.

Although mobile station m sends reception quality information to all cells in which a UL DPCH is set in the present embodiment, the present invention is not limited to this form, and mobile station m may select any one or a plurality of cells and transmit the reception quality information to these cells. In addition, although the RNC sends a best cell amendment report to mobile station m and all cells in which a DL DPCH is set in the present embodiment, the RNC may also select any cell for transmitting the best cell amendment report.

Figure 8:
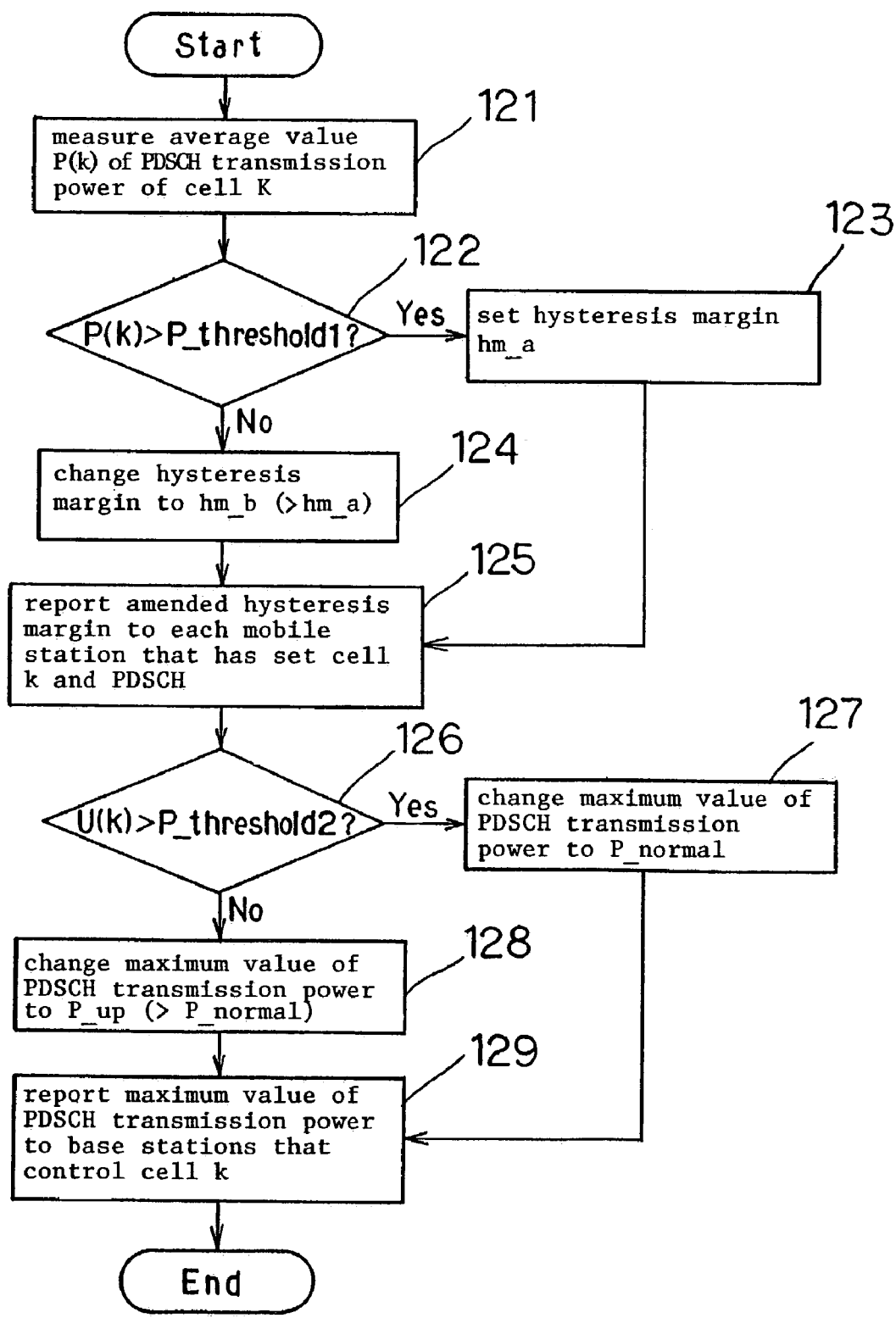
FIG. 8 is a flow chart showing the operation when the RNC amends the hysteresis margin of a mobile station that takes any cell k as the best cell in the mobile communication system of the first embodiment.

FIG. 8 is a flow chart showing the operation when the RNC amends the hysteresis margin of a mobile station that takes any cell k as the best cell.

Referring now to FIG. 8, the RNC measures the average value P(k) of the PDSCH transmission power of cell k at any timing in Step 121; and then, in Step 122, compares this average value P(k) with a first threshold value P_threshold1 that can be freely set. First threshold value P_threshold1 is a value that indicates that the data transmission power resource has sufficient surplus and that the degree of congestion is low; and values that can be considered as this value include the average value of the PDSCH transmission power for all cells, or the median value of the PDSCH transmission power of the cells that is calculated for all cells. If average value P(k) is greater than first P_threshold1 in Step 122, the RNC determines that the power resources for transmitting data lack sufficient surplus in Step 123 and determines that the degree of congestion is high in cell k, and therefore sets a small hysteresis margin hm_a. If average value P(k) is equal to or less than first threshold value P_threshold1 in Step 122, the RNC determines that the power resources for transmitting data have sufficient surplus, determines that the degree of congestion of cell k is low, and therefore sets a large hysteresis margin hm_b. The RNC next reports the altered hysteresis margin to each mobile station that has set a PDSCH with cell k.

The RNC next compares average P(k) and a second threshold value P_threshold2 that can be set to any value. The second threshold value P_threshold2 is a threshold value indicating that the degree of congestion is particularly low and that the power resources have an ample surplus, and normally is set equal to or lower than the first threshold value P_threshold1. If average value P(k) is greater than second threshold value P_threshold2 in Step 126, the RNC alters the maximum value of the PDSCH transmission power to P_normal in Step 127. If the average value P(k) is equal to or lower than second threshold value P_threshold2 in Step 126, the RNC recognizes that the power supply has sufficient surplus and alters the maximum value of the PDSCH transmission power to P_up, which is greater than P_normal, in Step 128. RNC next reports the maximum value of PDSCH transmission power that has been altered to base stations that control cell k in Step 129.

The base station uses the TPC bits of the UL DPCH to control the transmission power of the DL DPCH. The transmission power of the PDSCH is controlled by following the TPC bits of the UL DPCH. In other words, when the TPC bits notify a power-up to a base station, the transmission power of the DL DPCH is increased, and the transmission power of the PDSCH is also similarly increased. However, the PDSCH transmission power cannot be set greater than the maximum value of the PDSCH transmission power. Accordingly, when the maximum value of the PDSCH transmission power is low, the probability that the PDSCH transmission power can be secured will be low even when the TPC bits notify of a power-up, and the reduction in the transmission power per information bit results in the deterioration of the PDSCH reception quality and an increase in the probability of the occurrence of errors in data transmission.

On the other hand, cells having sufficient surplus of power resources have a high maximum value of PDSCH transmission power, and the probability of securing the PDSCH transmission power according to the TPC bit notification is therefore high and the probability of the occurrence of errors in data transmission can be reduced.

Although the hysteresis margins that can be set are of two types, hm_a and hm_b, in the present embodiment, the present invention is not limited to this form, and the hysteresis margin can also be set to three or more types depending on the value P(k), i.e., depending on the degree of congestion.

Figure 9:
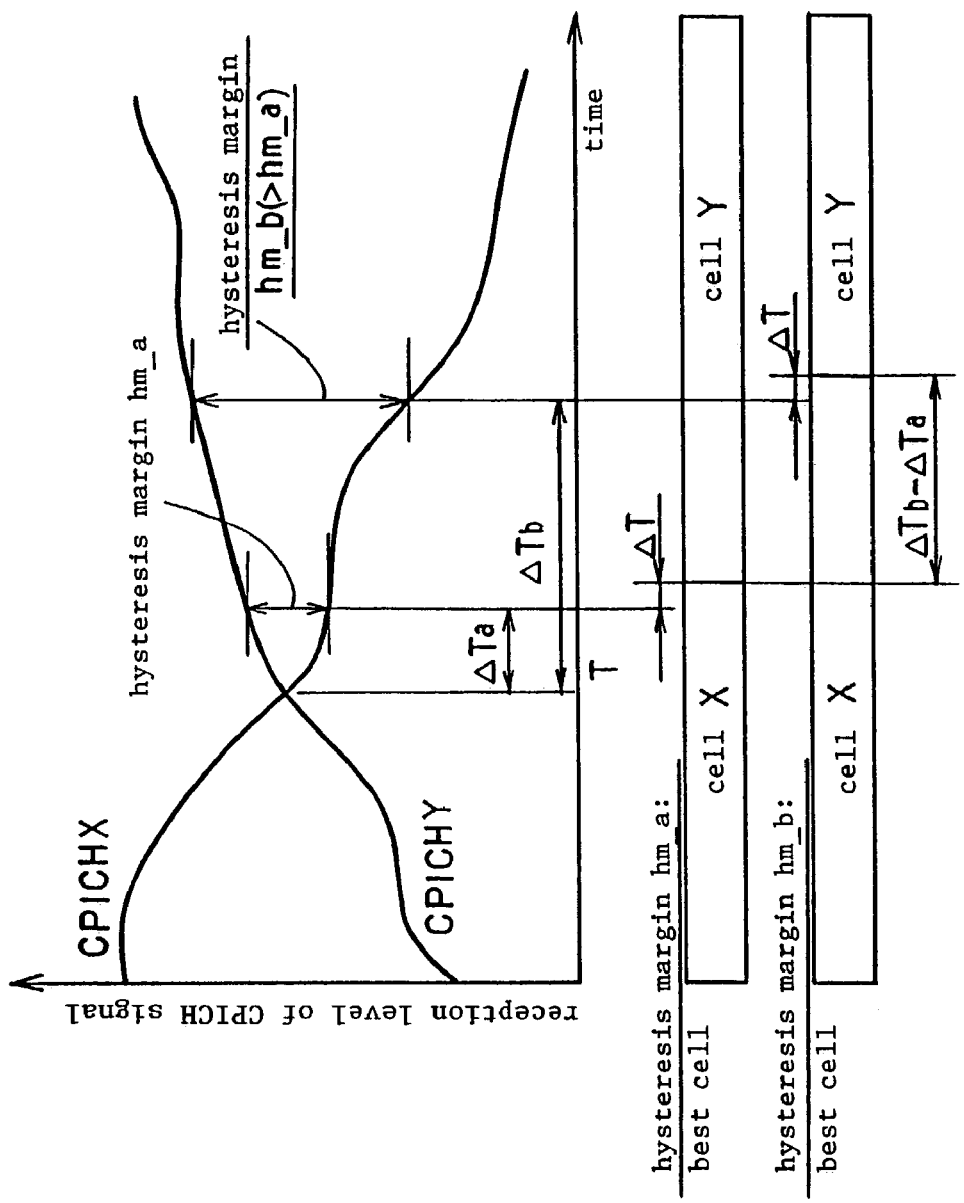
FIG. 9 shows how the timing of best cell amendment and the reception quality of a CPICH signal relating to any mobile station change according to the set values of the hysteresis margin.

FIG. 9 shows how the reception quality of a CPICH signal that relates to any mobile station and the timing of best cell amendment change in accordance with the set value of the hysteresis margin. Referring to FIG. 9, when a small hysteresis margin hm_a is set, a mobile station transmits the reception quality information of cell X and cell Y to the RNC after the passage of a time interval ΔTa from the time point T at which the reception quality of the CPICH of cell X and cell Y intersect, i.e., at time T+ΔTa. The best cell of this mobile station then changes from cell X to cell Y following a time interval ΔT at which this mobile station receives a best cell amendment notice from the RNC, i.e., at time T+ΔTa+ΔT.

When a large hysteresis margin hm_b is set (where hm_b>hm_a), the best cell of the mobile station also changes from cell X to cell Y by a similar process, but the best cell amendment is lengthened by a time interval of ΔTb−ΔTa. In other words, when the hysteresis margin is set to a small value, a mobile station in that cell easily switches to another cell, whereby the number of mobile stations in the cell decreases and the load on the cell is reduced.

Thus, by setting the hysteresis margin of cells in which the degree of congestion is high to a low level in the mobile communication system of the present embodiment, the mobile stations in a cell in which the degree of congestion is high easily switch to other cells, whereby the number of mobile stations in a cell having a high degree of congestion is reduced.

When cells in which the degree of congestion is high are immediately adjacent in the mobile communication system of the present embodiment, the hysteresis margin is set to a high level in both cells. However, if there is a significant difference in the reception quality of the two cells, and if this difference in quality equals or exceeds a set hysteresis margin, transition will occur between the cells even though both cells may have a large amount of traffic and a high degree of congestion. Thus, in the mobile communication system of the present embodiment, transitions will occur between two neighboring cells even when both cells are experiencing a high degree of congestion.

As a result, the mobile communication system of the present embodiment allows the selection of cells with even slightly better reception quality and thus allows an improvement in data rate, whereby the system throughput of cells having a high degree of congestion can be improved.

Moreover, facilitating a decrease in the number of mobile stations in cells having a high degree of congestion further facilitates an improvement of the traffic balance with cells having a lower degree of congestion. Finally, the reduction of the frequency of best cell amendment for mobile stations in cells having a low degree of congestion enables a reduction of the processing load on the RNC, and to an equal extent, enables an increase in the margin of the processing capacity of the RNC, which itself has a limited processing capacity.

Second Embodiment

Explanation next regards the mobile communication system of the second embodiment of the present invention. The mobile communication system of the above-described first embodiment was described for a case in which the average value of the transmission power of the downlink shared channels PDSCH was used to measure the degree of congestion in each base station. In contrast, the mobile communication system of the second embodiment of the present invention will be described for a case in which the average transmission power of the high-speed physical downlink shared channel HS-PDSCH (High-Speed PDSCH) is used to measure the degree of congestion at each base station. In a PDSCH, the reception quality is maintained at a uniform level chiefly by controlling the transmission power, but in a HS-PDSCH, the transmission power is kept uniform and the reception quality is maintained at or above a fixed level by using a control method referred to as AMCS (Adaptive Modulation and Coding Schemes) to freely alter the modulation method, coding ratio, and multicode number and thus maintain the transmission power per information bit at or above a fixed level.

Accordingly, when a HS-PDSCH is used to determine the degree of congestion at each base station in the mobile communication system of the present embodiment, the degree of congestion of each base station is determined using the number of mobile stations that have set a HS-PDSCH with the base station that is the object of measurement, rather than using the transmission power.

The configuration of the mobile communication system in the present embodiment is a configuration in which the PDSCH of FIG. 1 is revised to HS-PDSCH. The state of the channels that are set by mobile station 8a and base stations 1 and 2 in FIG. 1 is similarly as shown in FIG. 2 with the PDSCH altered to a HS-PDSCH.

In the second embodiment, the degree of congestion is determined through the use of the average transmission power of the HS-PDSCH, which is the data transmission channel.

Figure 10:
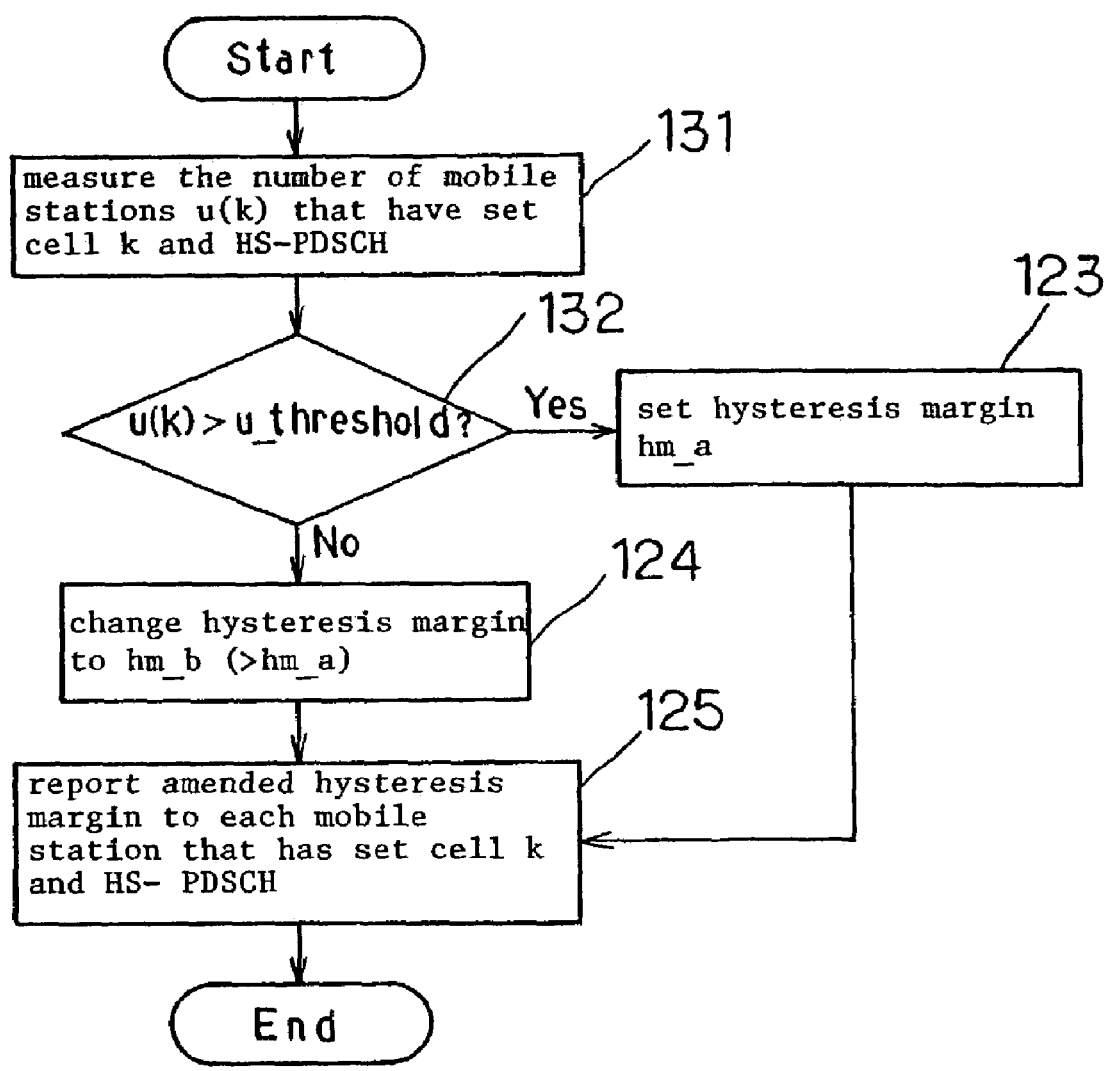
FIG. 10 is a flow chart showing the operations when RNC amends the hysteresis margin of a mobile station that takes any cell k as the best cell in the mobile communication system of the second embodiment of the present invention.

FIG. 10 is a flow chart showing the operation when the RNC changes the hysteresis margin of a mobile station that takes any cell k as the best cell in the mobile communication system of the present embodiment.

Referring to FIG. 10, the RNC first measures, in Step 131, the number of mobile stations u(k) that have set cell k and HS-PDSCH at any timing, and then, in Step 132, compares the number of mobile stations u(k) and a threshold value u_threshold that can be freely set.

Threshold value u_threshold is a threshold value indicating a small number of mobile stations in the cell and a low degree of congestion, and values that can be considered for this value include the average number of mobile stations in all cells that set a HS-PDSCH, or a value obtained by calculating for all cells, the median value of the number of mobile stations per cell that set a HS-PDSCH. When the number of mobile stations u(k) is greater than threshold value u_threshold in Step 132, the RNC determines in Step 123 that there is a large number of mobile stations in the cell, determines that the degree of congestion in cell k is high, and sets a small hysteresis margin hm_a. If the number of mobile stations u(k) is equal to or less than threshold value u_threshold in Step 132, the RNC determines that there are few mobile stations in the cell, determines that the degree of congestion in cell k is low, and sets a large hysteresis margin hm_b. The RNC then reports the amended hysteresis margin to each mobile station that has set cell k and HS-PDSCH in Step 125.

Third Embodiment

Explanation next regards the mobile communication system according to the third embodiment of the present invention.

In the above-described mobile communication system of the second embodiment, the number of mobile stations u(k) that have set cell k and HS-PDSCH was used to determine the degree of congestion and amend the hysteresis margin of cell k, but in the mobile communication system of the third embodiment of the present invention, the system throughput of the cell is used to determine the degree of congestion.

Figure 11:
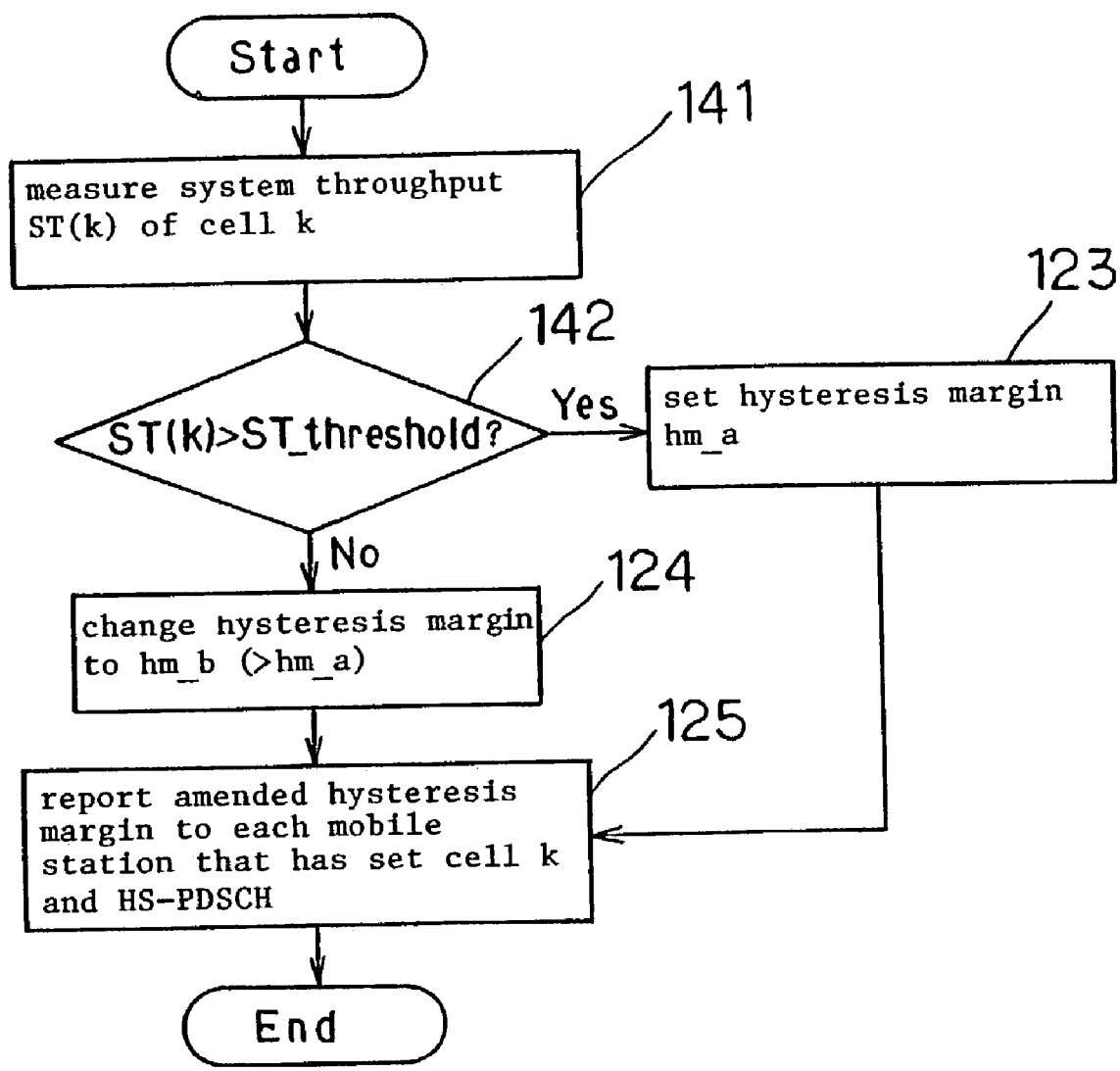
FIG. 11 is a flow chart showing operations when a RNC amends the hysteresis margin of a mobile station that takes any cell k as the best cell in the mobile communication system of the third embodiment of the present invention.

FIG. 11 is a flow chart showing the operations when the RNC amends the hysteresis margin of a mobile station that takes any cell k as the best cell in the mobile communication system of the present embodiment. FIG. 11 shows a process in which Steps 131 and 132 of the flow chart of FIG. 10 have been modified to Steps 141 and 142, respectively. More specifically, the RNC measures the system throughput ST(k) of cell k in Step 141 and then, in Step 142, compares this system throughput ST(k) with a threshold value ST_threshold that can be freely set. Threshold value ST_threshold is a threshold value that indicates that the amount of transmitted data per time unit is low and that the degree of congestion is low, and as this value, the average value of system throughput for all cells or the median value of system throughput of cells that is calculated for all cells can be considered. If system throughput ST(k) is greater than threshold value ST_threshold in Step 142, the RNC determines in Step 123 that the amount of transmitted data per time unit is high, determines that the degree of congestion of cell k is high, and sets a small hysteresis margin hm_a. If system throughput ST(k) is equal to or lower than threshold value ST_threshold in Step 142, the RNC determines in Step 124 that the amount of transmitted data per time unit is low, determines that the degree of congestion in cell k is low, and sets a large hysteresis margin hm_b. In Step 125, the RNC then reports the amended hysteresis margin to each mobile station that has set cell k and HS-PDSCH.

Fourth Embodiment

Explanation next regards the mobile communication system of the fourth embodiment of the present invention.

In the above-described mobile communication system of the third embodiment of the present invention, the system throughput ST(k) of cell k was used to determine the degree of congestion and to amend the hysteresis margin of cell k, but in the mobile communication system of the fourth embodiment of the present invention, the average user throughput of a cells is used to determine the degree of congestion. User throughput indicates the number of bits that a mobile station succeeds in receiving per time unit and is calculated with consideration given to delay.

Figure 12:
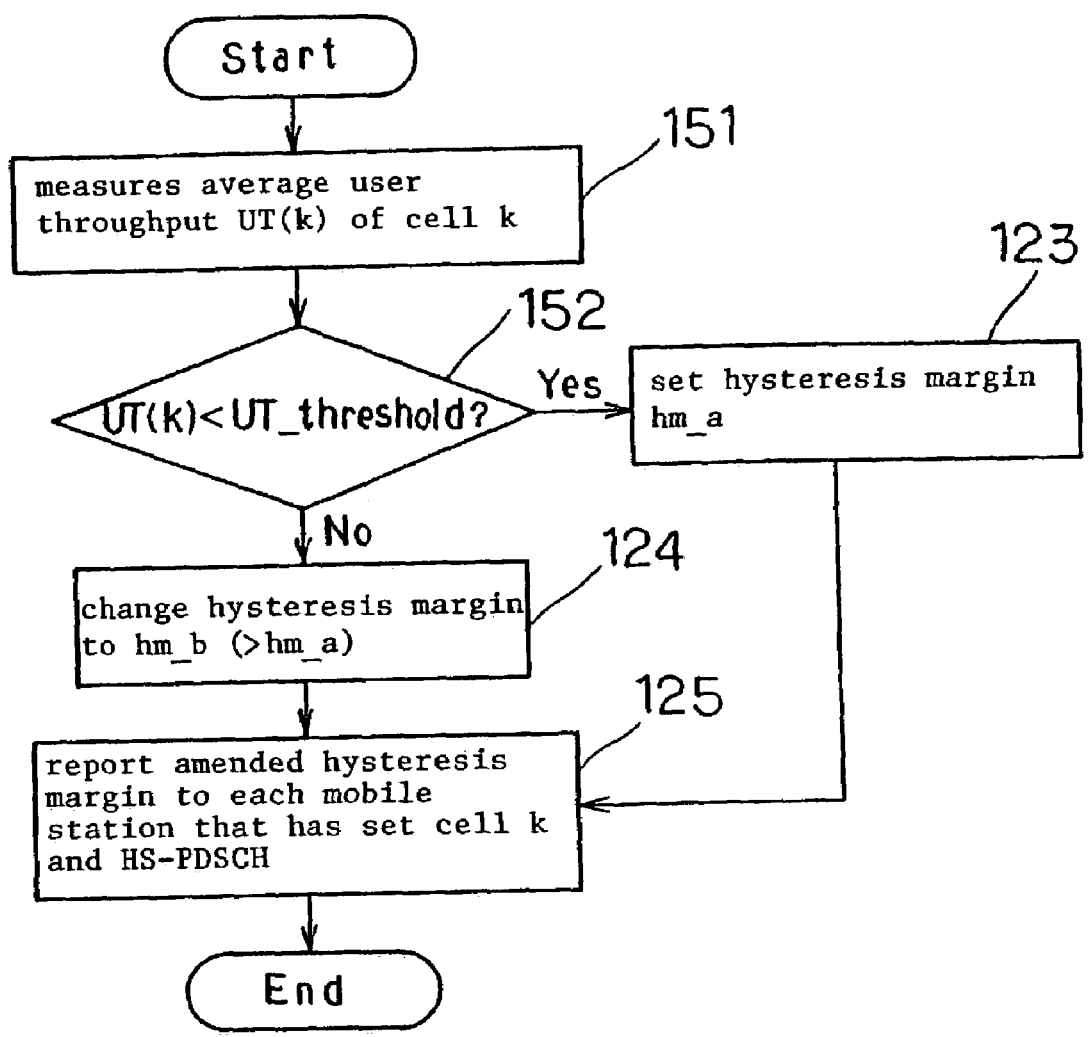
FIG. 12 is a flow chart showing the operations when a RNC amends the hysteresis margin of a mobile station that takes any cell k as the best cell in the mobile communication system of the fourth embodiment of the present invention.

FIG. 12 is a flow chart showing the operations when the RNC amends the hysteresis margin of a mobile station that takes any cell k as the best cell. FIG. 12 shows a process in which Steps 141 and 142 of the flow chart shown in FIG. 11 have been altered to Steps 151 and 152, respectively. More specifically, the RNC measures average user throughput UT(k), i.e., the average throughput of each user that is connected to cell k and HS-PDSCH, in Step 151; and then, in Step 152, compares this average user throughput UT(k) with a threshold value UT_threshold that can be freely set. Threshold value UT_threshold is a threshold value that indicates that the delay of transmission to each user in a cell is small and that the degree of congestion is low, and as this value, the average of the throughput for all cells, or the median value of the average user throughput per cell that is calculated taking the entire cell as the object. If the average user throughput UT(k) is smaller than the threshold value UT_threshold in Step 152, RNC determines in Step 123 that the transmission delay to each user in the cell is large, determines that the degree of congestion of cell k is high, and sets a small hysteresis margin hm_a. If the average user throughput UT(k) is equal to or greater than the threshold value UT_threshold in Step 152, the RNC determines in Step 124 that the transmission delay to each user in the cell is small, determines that the degree of congestion in cell k is low, and sets a large hysteresis margin hm_b. The RNC then reports in Step 125 the amended hysteresis margin to each mobile station that has set cell k and HS-PDSCH.

When amending the hysteresis margin in each of the above-described first to fourth embodiments, the hysteresis margin was altered for all mobile stations in a cell. However, the present invention can be similarly worked when the hysteresis margin is applied after amendment to mobile stations that newly set a DPCH in a cell (including cases in which the DPCH is set by handover) without effecting a change for all mobile stations. Alternatively, The total transmission power of the DL DPCH transmission power may be used in determining the degree of congestion.

In recent years, moreover, mobile communication systems have been proposed in which the data rate of each mobile station can be altered by adaptively selecting the SF (Spreading Factor) of the downlink shared channel PDSCH, and mobile communication systems have been proposed in which reception quality is maintained at or above a fixed level by keeping the transmission power per information bit at or above a fixed level through the use of control methods referred to as AMCS (Adaptive Modulation and Coding Schemes) in which the transmission power of the high-speed downlink shared channel HS-PDSCH is kept uniform and the modulation method, encoding ratio and multicode number are freely altered.

Applying the best cell amendment method according to the present invention to a mobile communication system that presupposes the use of this type of adaptive SF selection or AMCS enables processing for selecting a cell having even slightly better quality as the best cell, and in a system in which an adaptive SF is selected, enables the selection of SF having a high data rate. Furthermore, applying the best cell amendment method of the present invention to a mobile communication system that uses AMCS enables the selection of AMCS having a high data rate through the selection of cells having even slightly better quality, and thus can raise system throughput of cells having a high degree of congestion.

While preferred embodiments of the present invention have been described using specific terms, such description is for illustrative purposes only, and it is to be understood that changes and variations may be made without departing from the spirit or scope of the following claims.

What is claimed is:

1. A best-cell amendment method comprising the steps of:
at a radio network controller:
   determining a hysteresis margin for each cell, this hysteresis margin being a threshold value for determining whether or not a best cell is to be amended, and notifying each mobile station of the determined hysteresis margin by way of a base station;
at said mobile stations:
   measuring reception quality of a downlink signal of the best cell and reception quality of a downlink signal of another cell having the highest reception quality, and if the reception quality of said other cell having the highest reception quality is higher than the reception quality of said best cell by a margin that is equal to or greater than a set hysteresis margin, reporting the results of measuring reception quality as reception quality information to said radio network controller;
at said radio network controller:
   upon receiving reception quality information from a mobile station, executing control to amend the best cells of mobile stations that transmitted the reception quality information; and
at said radio network controller:
   measuring the degree of congestion of each cell and, based on the degree of congestion, amending the hysteresis margins of the cells.

2. A best-cell amendment method according to claim 1, wherein said step in which said radio network controller amends the hysteresis margin of each cell based on the degree of congestion is a step of decreasing the hysteresis margin of a cell having a high degree of congestion.

3. A best-cell amendment method according to claim 1, further comprising a step in which said radio network controller effects control to increase the transmission power of a data transmission channel of a cell having a low degree of congestion.

4. A best-cell amendment method according to claim 1, wherein said step in which said radio network controller measures the degree of congestion of each cell is a step of determining the degree of congestion based on the average of the transmission power of data transmission channels of the base station that controls each of said cells.

5. A best-cell amendment method according to claim 1, wherein said step in which said radio network controller measures the degree of congestion of each cell is a step of determining the degree of congestion based on the number of mobile stations that set a downlink shared channel with the base station that controls said cells.

6. A best-cell amendment method according to claim 1, wherein said step in which said radio network controller measures the degree of congestion of each cell is a step of determining the degree of congestion based on the system throughput in said cells.

7. A best-cell amendment method according to claim 1, wherein said step in which said radio network controller measures the degree of congestion of each cell is a step of determining the degree of congestion based on average user throughput in said cells.

8. A mobile communication system, comprising:
a plurality of base stations, each of said base stations controlling cells;
at least one radio network controller for determining a hysteresis margin for each cell, said hysteresis margin being a threshold value for determining whether or not a best cell is to be amended; reporting a determined hysteresis margin to each mobile station by way of a base station; upon receiving reception quality information from a mobile station; both amending the best cell of the mobile station that has sent in the reception quality information and measuring the degree of congestion of each cell; and amending the hysteresis margin of each cell based on the degree of congestion; and
a plurality of mobile stations for measuring reception quality of a downlink signal of a best cell and reception quality of a downlink signal of another cell having the highest reception quality; and when the reception quality of said other cell having the highest reception quality is higher than the reception quality of said best cell by a margin that is equal to or greater than a hysteresis margin that has been set, reporting the measurement results of reception quality as reception quality information to said radio network controller.

9. A mobile communication system according to claim 8, wherein said radio network controller executes control for reducing the hysteresis margin of a cell having a high degree of congestion.

10. A mobile communication system according to claim 8, wherein said radio network controller executes control for increasing the transmission power of a data transmission channel of a cell having a low degree of congestion.

11. A mobile communication system according to claim 8, wherein said radio network controller determines the degree of congestion based on the average transmission power of data transmission channels of a base station that controls each of the cells.

12. A mobile communication system according to claim 8, wherein said radio network controller determines the degree of congestion based on the number of mobile stations that set downlink shared channels with the base stations that controls each cell.

13. A mobile communication system according to claim 8, wherein said radio network controller determines the degree of congestion based on system throughput in each cell.

14. A mobile communication system according to claim 8, wherein said radio network controller determines the degree of congestion based on average user throughput in each cell.

15. A radio network controller comprising:
a means for determining a hysteresis margin for each cell that is controlled by a base station, said hysteresis margin being a threshold value for determining whether or not to amend a best cell;
a means for reporting said determined hysteresis margin to each mobile station by way of a base station; and
a means for, upon receiving reception quality information that each mobile station reports after determining that the reception quality of a cell other than the best cell is higher than the reception quality of said best cell by a margin that is equal to or greater than the set hysteresis margin, amending the best cells of mobile stations that have sent in the reception quality information and measuring the degree of congestion of each cell and amending the hysteresis margins of these cells based on the degree of congestion.

16. A radio network controller according to claim 15, wherein said means for amending the hysteresis margin executes control to reduce the hysteresis margin of a cell having a high degree of congestion.

17. A radio network controller according to claim 15, wherein said means for amending the hysteresis margin executes control to increase the transmission power of the data transmission channel of cells having a low degree of congestion.

18. A radio network controller according to claim 15, wherein said measuring the degree of congestion determines the degree of congestion based on the average transmission power of data transmission channels of the base stations that control each cell.

19. A radio network controller according to claim 15, wherein said measuring the degree of congestion determines the degree of congestion based on the number of mobile stations that set a downlink shared channel with a base station that controls each cell.

20. A radio network controller according to claim 15, wherein said measuring the degree of congestion determines the degree of congestion based on the system throughput in each cell.

21. A radio network controller according to claim 15, wherein said measuring the degree of congestion determines the degree of congestion based on the average user throughput in each cell.

* * * * *